United States Patent
Kai et al.

(10) Patent No.: US 7,131,797 B2
(45) Date of Patent: Nov. 7, 2006

(54) TOOL HOLDER

(75) Inventors: Yoshiaki Kai, Numazu (JP); Katsuhito Endo, Fuji (JP); Yutaka Asanome, Numazu (JP); Kouichi Katoh, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 289 days.

(21) Appl. No.: 10/315,982

(22) Filed: Dec. 11, 2002

(65) Prior Publication Data

US 2003/0147712 A1 Aug. 7, 2003

(30) Foreign Application Priority Data

Dec. 11, 2001 (JP) ............................. 2001-377059

(51) Int. Cl.
*B23B 29/02* (2006.01)
*B23Q 3/12* (2006.01)

(52) U.S. Cl. ..................... 408/143; 409/141

(58) Field of Classification Search ............. 74/574; 82/158; 408/143; 409/141, 234; 188/378
See application file for complete search history.

(56) References Cited

U.S. PATENT DOCUMENTS

| | | | | |
|---|---|---|---|---|
| 3,378,115 A | * | 4/1968 | Stephens, III | 188/218 A |
| 4,825,983 A | * | 5/1989 | Nakanishi | 188/378 |
| 5,322,304 A | * | 6/1994 | Rivin | 279/103 |
| 5,595,391 A | * | 1/1997 | Rivin | 279/103 |
| 5,975,816 A | * | 11/1999 | Cook | 409/131 |
| 6,231,282 B1 | * | 5/2001 | Yoneyama et al. | 409/234 |
| 6,382,888 B1 | * | 5/2002 | Cook | 409/141 |
| 6,537,000 B1 | * | 3/2003 | Weck | 409/141 |

FOREIGN PATENT DOCUMENTS

| | | | |
|---|---|---|---|
| DE | 10239670 A1 | * | 3/2004 |
| JP | 01083947 A | * | 3/1989 |
| JP | 01098731 A | * | 4/1989 |
| JP | 1993-277806 | | 10/1993 |
| JP | 07223103 A | * | 8/1995 |
| JP | 2001054832 A | * | 2/2001 |
| JP | 2001079725 A | * | 3/2001 |
| JP | 2001328022 A | * | 11/2001 |
| JP | 2002018660 A | * | 1/2002 |
| SU | 1669638 A1 | * | 8/1991 |
| SU | 1759567 A1 | * | 9/1992 |

* cited by examiner

*Primary Examiner*—Monica Carter
*Assistant Examiner*—Michael W. Talbot
(74) *Attorney, Agent, or Firm*—Pillsbury Winthrop Shaw Pittman LLP

(57) ABSTRACT

A tool holder has a cutter arbor. The cutter arbor has a shank portion detachably mounted on a spindle, and a mechanism for holding a cutting tool. In the cutter arbor portion, a cavity portion is formed. In the cavity portion, a vibration damping material is filled at a filling rate so as to be capable of obtaining predetermined vibration damping characteristics. Thus, it is possible to provide high vibration damping characteristics, effectively damp vibrations during cutting and improve working precision, without using any special materials, such as damping materials, although the tool holder has a usual shape.

5 Claims, 1 Drawing Sheet

TOOL HOLDER

CROSS REFERENCE TO RELATED APPLICATIONS

This application claims priority to Japanese application No. 2001-377059, filed Dec. 11, 2001, the content of which is incorporated herein in its entirety by reference.

BACKGROUND OF THE INVENTION

1. Field of the Invention

The present invention generally relates to a tool holder for attaching a cutting tool to a spindle of a machine tool.

2. Description of Related Art

In machine tools, a cutting tool is exposed continuously to cutting resistance forces and so forth during a cutting process for a work piece, so that vibratory forces are unavoidably generated. Since vibrations generated in the cutting tool have a harmful influence on working precision in machine tools, so that various measures are conventionally taken.

In general, the cutting tools and tool holders are made of materials having high vibration damping characteristics to inhibit vibrations during cutting processes, and/or tool holders are integrally formed with damping materials by welding or shrinkage fit to inhibit vibrations.

In addition to the enhancement of the vibration damping characteristics of the tool holder itself, it is a well-known art to incorporate a damping mechanism in a spindle unit. For example, Japanese Patent Laid-Open No. 1994-277806 discloses a damping mechanism in which elastic body and a viscous fluid are filled between a spindle unit and a spindle head to damp vibrations by the elastic deformation of the elastic body and the viscous resistance of the fluid.

However, it is not possible to expect effective damping capacity by depending on the vibration damping characteristics of the materials themselves of the tools and tool holders like conventional measures. In particular, vibrations are transferred to a machined surface in finishing machining, so that the working precision on the machined surface deteriorates. In addition, the damping materials have a problem in production costs since the damping materials are generally expensive. Moreover, there is a problem in that it is not obtain a damping action effective in the prevention of fretting which is caused on the inner peripheral surface of a tapered hole of a spindle contacting a taper shank of the tool holder.

SUMMARY OF THE INVENTION

It is therefore an object of the present invention to eliminate the aforementioned problems and to provide a tool holder which has high vibration damping characteristics, which can effectively damp vibrations during cutting processes and which is effective in the improvement of working precision, without using any special materials, such as damping materials, although the tool holder has a usual shape.

In order to accomplish the aforementioned and other objects, according to one aspect of the present invention, a tool holder for a spindle of a machine tool, said tool holder comprises an arbor having a shank portion which is detachably attached on the front end of the spindle, and a mechanism for holding a cutting tool, a cavity portion defined in the arbor; and a vibration damping material charged in the cavity portion at a predetermined charging rate in a manner that the damping material shows vibration damping characteristics.

According to the present invention, by vibrations produced during a cutting work, sand particles filled in the cavity portion collide with each other and with the walls of the cavity portion to convert vibrational energy into thermal energy, so that vibrations can gradually attenuate.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DETAILED DESCRIPTION OF A PREFERRED EMBODIMENT OF THE INVENTION

Referring now to the accompanying drawings, a preferred embodiment of a tool holder according to the present invention will be described below.

Figure 1:
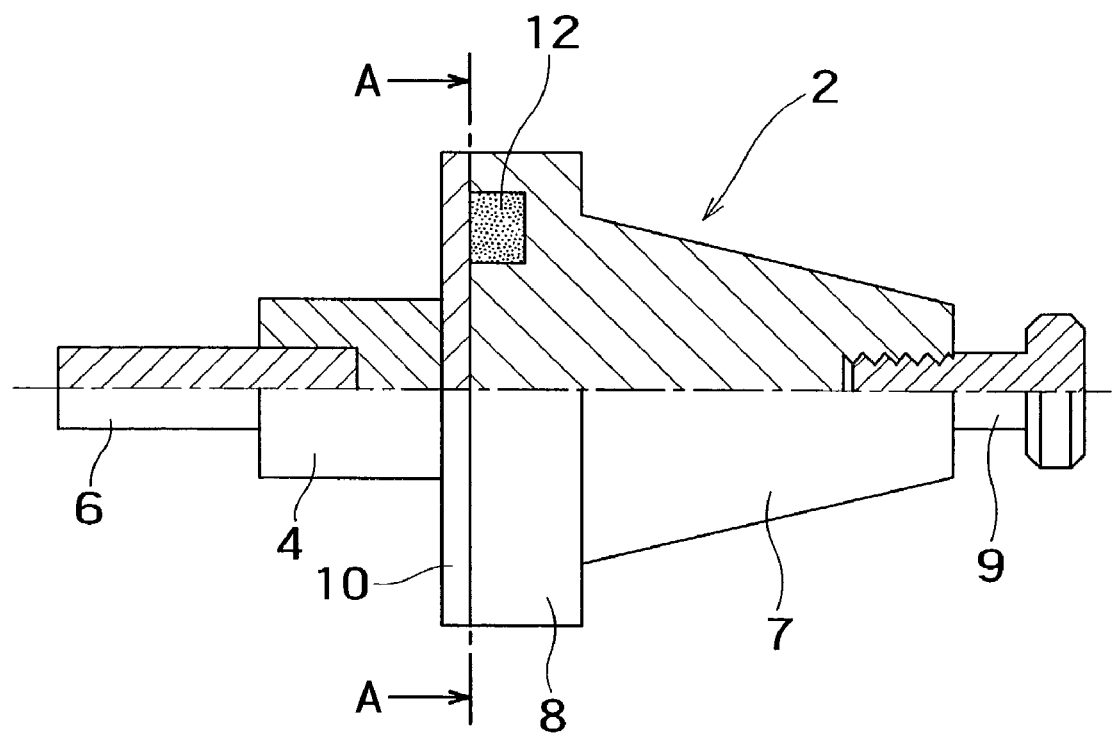
FIG. 1 is a partially sectional side view of a preferred embodiment of a tool holder according to the present invention.

FIG. 1 shows a tool holder in this preferred embodiment. Reference number 2 denotes an arbor constituting a body of a tool holder. On the front end portion of the arbor 2, a tool mounting portion 4 is provided. A cutting tool 6 is attached into the tool mounting portion 4 to be fixed thereto by means of a bolt (not shown).

The arbor 2 has a shank portion 7 and a flange portion 8. On the end portion of the shank portion 7, a pull stud 9 is fixed. By inserting the shank portion 7 into a tapered hole open on a spindle and by gripping and pulling the pull stud 9 by means of a collet connected to a draw bar built in a spindle, the arbor 2 can be fixed to the spindle.

Figure 2:
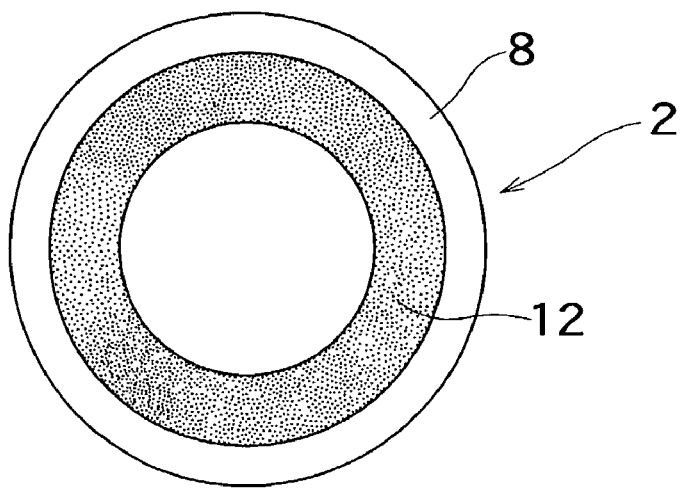
FIG. 2 is a sectional view taken along line A—A of FIG. 1.

As shown in FIG. 2, a ring-shaped groove is formed in the end face of the flange portion 8 of the arbor 2. By sealing the ring-shaped groove with a cover member 10, an annular cavity portion 12 filled with a vibration damping material therein is defined coaxially with the arbor 2. This cavity portion 12 is preferably arranged nearer to the cutting tool 6.

In this preferred embodiment, the vibration damping material is a viscous fluid, such as an oil, in which sand is densely mixed so that sand particles contact each other.

As the vibration damping material, only fine sand densely charged may be applicable. In addition to sand, fine glass particles, ceramic fine particles and metal particles may be used. The particle size and shape of the particles are not uniform but preferably uneven.

With this construction, the operation of the tool holder in this preferred embodiment will be described below.

When a cutting work is carried out, if the spindle is moved while rotating, the cutting tool 6 mounted on the tool holder cuts a work piece. In the cutting process, vibratory forces are generated by cutting resistance forces and so forth, and transferred from the cutting tool 6 to the arbor 2 to vibrate the arbor 2. By the vibrations, the sand particles charged in the cavity portion 12 start to move to collide with each other and with the walls of the cavity portion 12. Thus, vibratory energy is converted into thermal energy, so that the vibrations gradually attenuate. Therefore, in the finish machining, it is possible to prevent vibrations from being transferred to the machined surface. Since the movement of the particles is converted into thermal energy, it is possible to obtain a larger damping action than conventional tool holders which use special damping materials. In addition, by adjusting the charging rate and grain size of the particles, it is possible to obtain damping characteristics which are effective in the prevention of fretting wear caused on the outer peripheral surface of the shank portion 7.

By thus charging particles, such as particles of sand, in the cavity portion 12 in the arbor 2, it is possible to provide damping characteristics, which are not possessed by usual tool holders, to the tool holder to damp vibrations during the cutting work.

Furthermore, a viscous fluid may be charged at a flowable charging rate without using particles. In this case, vibratory energy is changed to thermal energy by the shear of the fluid according to the movement of the fluid, so that vibrations can be damped. Although the whole tool holder is unbalanced so that the center of gravity is slightly shifted from the shaft center, the fluid in the cavity portion 12 automatically compensates the unbalance of the tool holder in accordance with the rotation of the tool holder during working.

As described above, according to the present invention, a tool holder comprises a cutter arbor having a shank portion which is detachably mounted on a spindle, and a mechanism for holding a cutting tool, wherein a cavity portion is formed in the arbor, and a vibration damping material is filled in the cavity portion at a filling rate so as to be capable of obtaining predetermined vibration damping characteristics. Therefore, it is possible to provide high vibration damping characteristics, effectively damp vibrations during cutting and improve working precision, without using any special materials, such as damping materials, although the tool holder has a usual shape.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A tool holder for a spindle of a machine tool, said tool holder comprising:
    an arbor having a shank portion which is detachably attached on a front end of the spindle, a flange portion, and a mechanism for holding a cutting tool;
    a cavity portion defined in an end face of the flange portion;
    a vibration damping material charged in the cavity portion, and
    cover member arranged on said end face and configured to seal said cavity portion,
    wherein said end face is opposite another end face of said flange portion from which the shank portion extends, and
    wherein said end faces are substantially perpendicular to a longitudinal axis of said arbor.

2. A tool holder according to claim 1, wherein said vibration damping material comprises particles of a hard material, or a mixture of particles and liquid.

3. A tool holder according to claim 1, wherein said vibration damping material is a viscous fluid which is filled at a flowable charging rate.

4. A tool holder according to claim 2, wherein said hard material comprises sand or fine particles of glass, metal, or ceramics which lacks in uniformity of size and shape.

5. A tool holder according to claim 1, wherein said cavity portion has a generally annular cross section coaxial with the arbor.

* * * * *